United States Patent
Oude Grotebevelsborg et al.

(10) Patent No.: US 11,554,566 B2
(45) Date of Patent: Jan. 17, 2023

(54) DOOR FOR SOLID WASTE PRESS

(71) Applicant: ANAERGIA B.V., Oldenzaal (NL)

(72) Inventors: Willem Jan Oude Grotebevelsborg, Oldenzaal (NL); Carlo Gonella, Roccagrimalda (IT)

(73) Assignee: ANAERGIA B.V., Oldenzaal (NL)

( * ) Notice: Subject to any disclaimer, the term of this patent is extended or adjusted under 35 U.S.C. 154(b) by 31 days.

(21) Appl. No.: 16/083,219

(22) PCT Filed: Mar. 16, 2017

(86) PCT No.: PCT/EP2017/056294
§ 371 (c)(1),
(2) Date: Sep. 7, 2018

(87) PCT Pub. No.: WO2017/158119
PCT Pub. Date: Sep. 21, 2017

(65) Prior Publication Data
US 2019/0054712 A1    Feb. 21, 2019

Related U.S. Application Data

(60) Provisional application No. 62/310,337, filed on Mar. 18, 2016.

(51) Int. Cl.
*B30B 9/06* (2006.01)
*B09B 1/00* (2006.01)
*B09B 3/20* (2022.01)

(52) U.S. Cl.
CPC ............. *B30B 9/067* (2013.01); *B09B 1/00* (2013.01); *B09B 3/20* (2022.01)

(58) Field of Classification Search
CPC .... B30B 9/02; B30B 9/04; B30B 9/06; B30B 9/062; B30B 9/067; B30B 9/262;
(Continued)

(56) References Cited

U.S. PATENT DOCUMENTS 3,070,003 A * 12/1962 Stacy .................. B30B 9/067
100/51
3,168,033 A * 2/1965 Hansen ............... B30B 9/067
100/179
(Continued)

FOREIGN PATENT DOCUMENTS

DE    3113515 A1 * 11/1982 ............ B30B 9/067
EP    0468853 A1    1/1992
(Continued)

OTHER PUBLICATIONS

International Patent Application No. PCT/EP2017/056294, International Preliminary Report on Patentability dated Sep. 27, 2018.
(Continued)

*Primary Examiner* — Jimmy T Nguyen
(74) *Attorney, Agent, or Firm* — Greer, Burns & Crain, Ltd

(57) ABSTRACT

A press (10) for waste has a chamber that is enclosed in part by a sliding door (20). The door has an extrusion section (22) and an expulsion section (24). The extrusion section encloses the chamber while waste (18) is compressed in the chamber to extrude a wet fraction (32) of the waste. The expulsion section abuts the chamber when a remaining dry fraction (40) of the waste expelled. Preferably, the expulsion section is above the extrusion section. Various details of the door account for leakage of wet fraction waste between the chamber and the door.

17 Claims, 4 Drawing Sheets

(58) Field of Classification Search
CPC ... B30B 9/3014; B30B 9/3025; B30B 9/3039; B30B 9/065; B09B 3/0025; B09B 3/20; B09B 1/00
USPC .................................. 100/37, 110–112, 127
See application file for complete search history.

(56) References Cited

U.S. PATENT DOCUMENTS

| | | | | |
|---|---|---|---|---|
| 4,650,546 | A * | 3/1987 | Le Jeune | B09B 3/00 201/6 |
| 4,755,332 | A * | 7/1988 | Mizuno | B30B 11/025 100/903 |
| 5,001,975 | A * | 3/1991 | Finden | B30B 9/067 100/232 |
| 5,251,552 | A * | 10/1993 | Gourdol | B30B 9/06 100/127 |
| 5,263,411 | A * | 11/1993 | Gourdol | B30B 9/067 100/127 |
| 5,307,739 | A * | 5/1994 | Gourdol | B30B 9/067 100/127 |
| 5,746,126 | A * | 5/1998 | Huang | B30B 9/3014 100/125 |
| 2006/0086262 | A1 * | 4/2006 | Kim | B30B 9/067 100/37 |
| 2014/0346702 | A1 * | 11/2014 | Kelly | B30B 15/34 264/40.5 |

FOREIGN PATENT DOCUMENTS

| | | | | |
|---|---|---|---|---|
| EP | 0818303 | A1 | 1/1998 | |
| EP | 2292419 | A2 | 3/2011 | |
| JP | 3581091 | B2 * | 10/2004 | ........... B30B 9/3039 |
| JP | 2011067854 | A | 4/2011 | |
| WO | WO-2010097177 | A1 * | 9/2010 | ........... B09B 3/0025 |

OTHER PUBLICATIONS

International Patent Application No. PCT/EP2017/056294, International Search Report and Written Opinion dated Jun. 29, 2017.

* cited by examiner

DOOR FOR SOLID WASTE PRESS

CROSS-REFERENCE TO RELATED APPLICATIONS

This application is a National Stage Entry of International Application No. PCT/EP2017/056294, filed Mar. 16, 2017, which is a non-provisional application of U.S. Application Ser. No. 62/310,337, filed Mar. 18, 2016. International Application No. PCT/EP2017/056294 and U.S. Application Ser. No. 62/310,337 are incorporated by reference.

BACKGROUND

This specification relates to presses for treating solid waste and methods of operating them.

Solid waste includes, for example, municipal solid waste (MSW), source separated organics (SSO) and waste from industrial, commercial and institutional (ICI) sources. The waste can de divided into various fractions. For example, the organic fraction is the part of the waste that is most easily biodegraded and may also be referred to as organic waste. The organic fraction is primarily made up of food waste, but may also include leaf and yard waste or other materials. The organic fraction is approximately 40% of ordinary MSW after recyclables are removed. SSO may have an organic fraction of 80% or more and ICI wastes can have varying amounts of organic material.

Historically, organic waste was landfilled with other solid waste. However, the organic fraction of solid waste is the major cause of greenhouse gas emissions, leachate and odors in landfills. There is a general trend to divert organic waste for biological treatment, for example by anaerobic digestion (AD) or composting. Most biological treatment steps require some preprocessing of the waste such as debagging and sorting to remove large items such as bottles and cans. Certain biological treatments, such as some composting methods and high-solids slurry and wet (low solids) anaerobic digestion, also require that the waste be reduced in size and homogenized. The size reduction is typically done in a device that comminutes the waste, such as a hammer mill, shredder or pulper. In some cases, the comminuting device also provides a coarse separation of contaminants (i.e. material that is not readily biodegraded, such as plastic). Alternatively, a separate separation device may be added. With adequate processing, at least some of the non-organic waste may be used, for example as refuse derived fuel (RDF), rather than landfilled.

Recently, there have been various attempts to use presses to separate solid waste into organic and non-organic fractions. The organic fraction may also be called a wet fraction and the non-organic fraction may also be called a dry fraction. In general, the solid waste is loaded into a chamber having a porous wall. A hydraulic ram compresses the waste, which causes liquids and soft materials (i.e. food waste) to be squeezed through the porous wall. Large pieces of primarily non-organic waste are retained in the chamber. The non-organic fraction can also include materials, such as wood, that are organic but would be difficult to digest. The non-organic waste is rejected through a door of the chamber. In some (but not all) cases the pressure of the ram is enough to break open cell walls in the organic waste that is squeezed through the porous wall.

US Publication 2013/0316428 describes one process in which an organic fraction is separated from solid waste in a press. The organic fraction is extruded through a grid having small-bore holes, under a pressure higher than the burst pressure of the cell membranes. The cells are disrupted and a gel or paste of a doughy consistency is produced. The gel can be digested in an anaerobic digester. Some examples of presses are described in European Publication Nos. 1207040 and 1568478, International Publication WO 2010/097177, and Italian patent application ITTO20111068. Commercially available presses include, for example, the Biosqueeze press sold by Finsterwalder and the VM 2000, Orex and Biorex presses sold by DB Technologies or Anaergia.

SUMMARY

This specification describes a device and process for separating solid waste into wet and dry fractions. The solid waste is loaded into a press chamber with one or more porous walls and compressed to squeeze the wet fraction out of the chamber. Later, a door of the chamber is opened and the retained waste (dry fraction) is pushed out of the chamber. The specification describes in particular the design of the door and related components, and the method of removing the dry fraction from the chamber.

A press described in the specification has a chamber for pressing waste with an opening. A sliding door covers the opening. The door has an extrusion section and an expulsion section. When the extrusion section is over the opening, the opening is generally closed (although the extrusion section may include a porous section) and waste can be compressed in the chamber. When the expulsion section is slid over the door, a ram can extend from the chamber and at least partially through the expulsion section. The ram removes pressed waste from the chamber and also scrapes leaked wet fraction from the expulsion section.

In an example, the expulsion section of the door is located above the extrusion section. The door slides in a frame forming a vertical passage. The door is raised when waste is compressed and lowered when compressed waste is expelled from the chamber. An opening in the expulsion section fits closely around the ram such that the ram scrapes the entire opening.

Optionally, at least part of the door frame may be movable relative to the chamber. For example, part of the frame may be bolted to the chamber through shims. In this way, as the door wears it can be moved closer to the chamber to inhibit leaks. In another option, the side of the frame may have a channel to release leaking wet fraction from the side of the door.

DETAILED DESCRIPTION

Solid waste may be, for example, municipal solid waste (MSW), source-separated organics (SSO), industrial, commercial and or institutional waste (ICI), or a mixture of one or more of these or other wastes. Optionally, the waste may be pre-processed to some extent, for example to open bags, to roughly homogenize the waste or to remove very large pieces of waste, metals, or other recyclables.

The waste is then further processed in a press. The press compresses the waste in a chamber. An organic fraction of the waste, alternatively called the wet fraction, is squeezed through perforations in at least one wall of the chamber. The perforations may be, for example, 4 to 8 mm diameter circular holes. Retained waste, optionally called a dry fraction or non-organic fraction, is initially retained in the chamber. The retained waste is ejected from the chamber after opening a door of the chamber. Presses that treat municipal solid waste (MSW) preferably operate at high pressures, for example 180 to 220 bar. Presses that operate at lower pressures, for example in a range of about 50 to 150 bar, may be preferred for SSO and ICI waste having high water content.

The pressed organic waste is typically a viscous paste or slurry with a 20-35 wt % solids content, for example 20-25% when pressing wet commercial waste and 30-35% when pressing residential MSW. The pressed organic waste typically has a 85-95% volatile solids to total solids ratio. The non-volatile solids include floatables (for example small pieces of plastic foil or paper) and grit. The pressed organic waste can be treated further, for example a wet or dry anaerobic digester, or converted into compost or other biosolids.

The inventors have observed that solid waste presses suffer from a variety of practical problems. For example, since the press operates under very high pressure, small leaks past the moving parts are almost inevitable, or at least would be excessively costly to avoid. The solid waste also contains minor amounts of grit such as sand or broken glass. When grit is entrained in waste pressurized in the press, the waste becomes highly abrasive. Moving parts, and surfaces exposed to moving parts, therefore wear down over time. Finally, separating the waste under substantial pressures creates relatively wet and dry fractions, but the wet fraction is not like the wet fractions produced by conventional separation techniques. In particular, the wet fraction has very high solids content, flows only when pressurized, and dries to a very hard, sometimes adhesive, solid. Over time, leaks and solid deposits can develop in a press and moving parts or bearing surfaces can wear out. When the leaks or wear become excessive, the pressing operation has to stop for cleaning or to replace worn out components.

Figure 1:
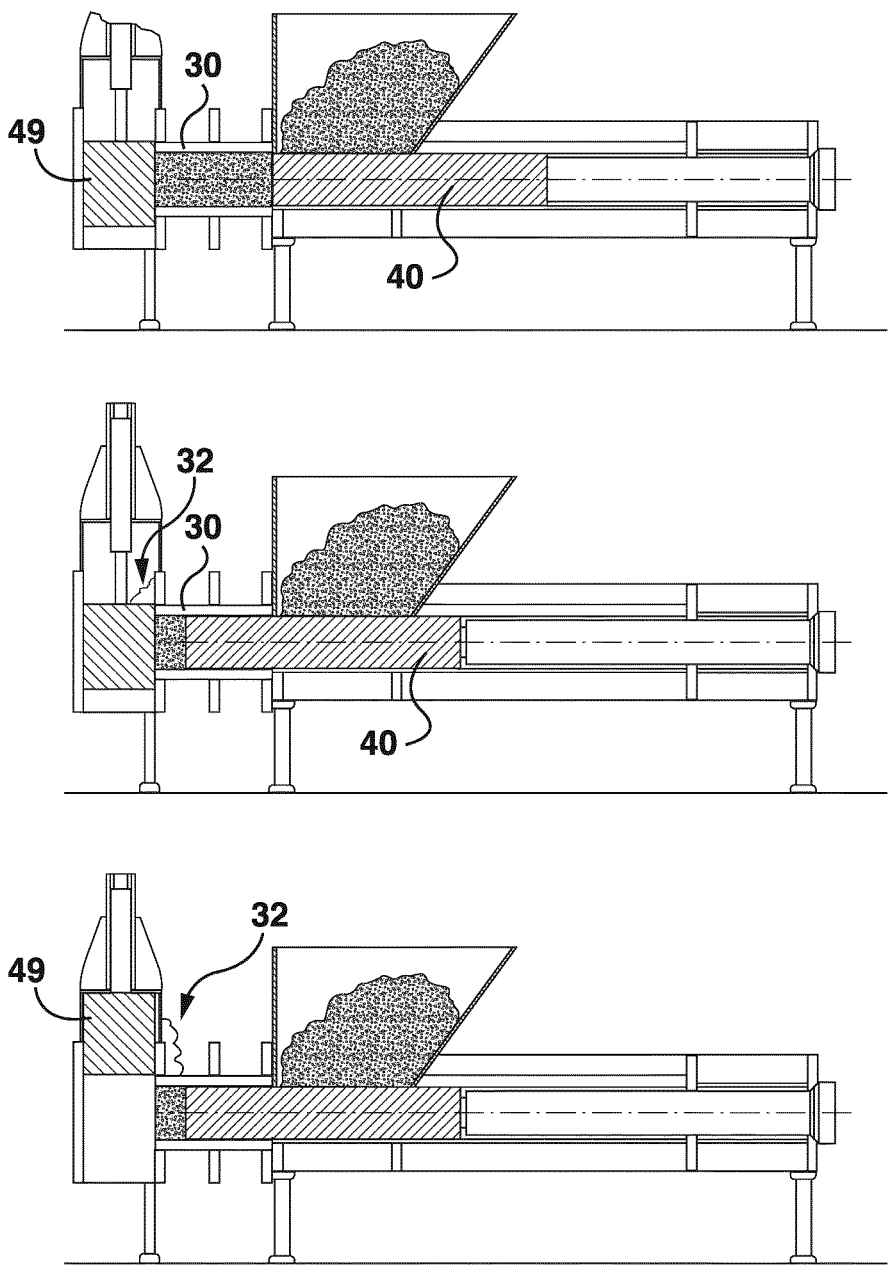
FIG. 1 is a reproduction of drawing sheet 2 of 7 from International Publication Number WO 2010/097177 with leaking wet fraction added.

For example, FIG. 1 shows a press described in International Publication Number WO 2010/097177, Machine for Processing the Organic Fraction of Urban Solid Waste, which is incorporated by reference. In this device, a pressing member 40 compresses waste in a perforated rectilinear tube 30, which provides a pressing chamber. A door (shutting means 49) moves downwards to close the end of tube 30 while the waste is being compressed. A liquid fraction of the waste is squeezed out though the perforations in tube 30. The door then moves upwards, which allows pressing member 40 to eject the remaining solid fraction out of the tube 30. During the compressing step (FIG. 5 of WO 2010/097177), some liquid fraction 32 (which was not part of the original Figure) leaks out to the top of the door 49. When the door is lifted in preparation for the ejection step (FIG. 6 of WO 2010/097177), the leaked liquid fraction 32 (which was not part of the original Figure) spills over. The amount of liquid fraction 32 that leaks out with each pressing is exaggerated in FIG. 1, but a significant amount leaks out over many pressing cycles. The right side face of the door 49 also wears down over time as the door slides up and down against the tube 30 with a film of abrasive liquid fraction 32 between these parts. The leaking increases as the door 49 wears. Given the high pressure in the press, even 1 mm of wear causes unacceptable leaking and so the machine has to be periodically stopped and dismantled to repair or replace the door 49 or tube 30.

A new press, described in detail further below, has a dry fraction exit door with two parts, an extrusion section and an expulsion section. The expulsion section is preferably located above the extrusion section. The door slides in a frame attached to a chamber of the press. During the waste compressing step, waste in a chamber is compressed against the extrusion section of the door. The door is preferably porous to allow a wet fraction of the waste to flow out of the chamber through holes in a face of the door. Optionally, however, the extrusion section of the door may be solid with pores provided only in walls of the chamber. In either case, wet fraction leaves the chamber.

Wet fraction that leaks upwards past to the extrusion section of the door collects in the expulsion section of the door. A portion of the frame extending outwards from the chamber prevents the leaked wet fraction from spilling out of the expulsion section.

Once the waste has been compressed, a dry fraction remaining in the chamber is expelled. The door slides to place the expulsion section of the door against the chamber. A ram then pushes the dry faction out of the chamber through an opening in the expulsion section of the door. As the ram passes through the expulsion section of the door, it scrapes leaked wet fraction out of the door.

Optionally, the frame of the door can be attached to the cylinder with adjustable fasteners such as bolts. The face of the door that slides against the chamber is fitted with a removable wear plate. When leakage starts, it is possible to pull the door frame closer to the chamber, for example by removing shims or adjusting the bolts. Eventually, after all available adjustment room has been used up, the wear plate on the door can be replaced and the frame can be moved back to its initial position.

In another option, the sides of the door frame have pressure release sections. These sections allow wet fraction to leak out from the side of the door rather than travel to the greased surfaces at the back of the door.

Figure 2:
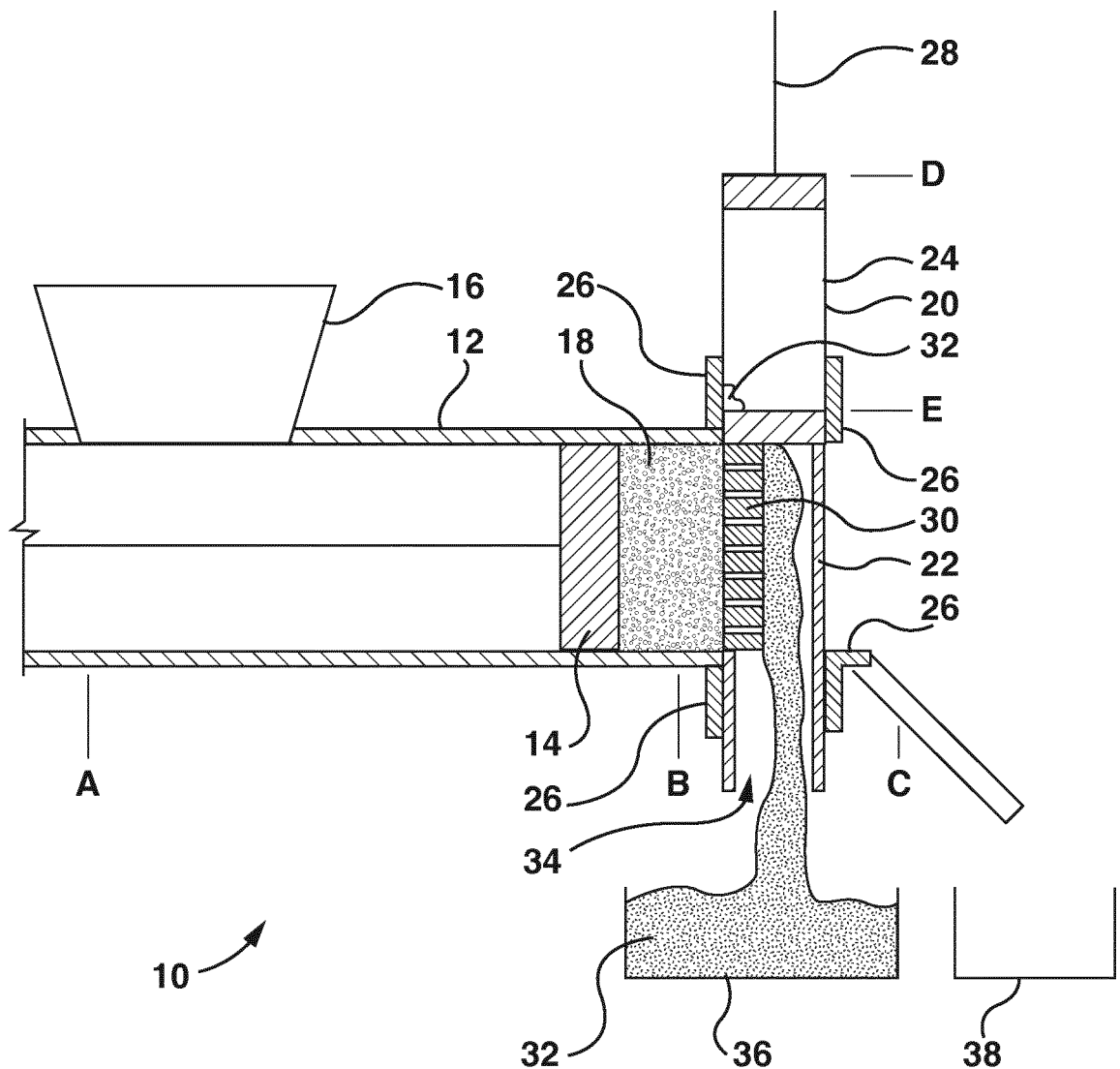
FIG. 2 shows a schematic cross-section in elevation view of a press while pressing solid waste.

Referring to FIG. 2, a press 10 has a chamber 12. In a cross-section perpendicular to FIG. 1, the chamber 12 may be round, square, rectangular or another shape. The chamber 12 has a feed opening 16 to allow solid waste 18 to be loaded into the chamber.

A ram 14, alternatively called a piston, cylinder (when the chamber 12 is round) or actuator, has a cross sectional shape like that of the chamber 12 and moves back and forth in the chamber 12. The ram 14 is typically moved by way of a hydraulic piston (not shown) but mechanical, electrical or other mechanisms might also be used. When the front of the ram 14 is retracted to position A, solid waste can be loaded into the chamber 12 ahead of the ram 14. When the front of the ram 14 advances to position B, as shown in FIG. 2, the solid waste 18 is compressed.

The press 10 has a door 20 fitted to an opening of the chamber 12. The door 20 can be opened to expose the opening in the chamber 12 or closed to generally cover the opening in the chamber 12. In the example shown, the door 20 is at the end of the chamber 12 opposite the feed opening 16 and in line with the motion of ram 14. The door 20 has two major sections, an extrusion section 22 and an expulsion section 24.

The door 20 is held against the chamber 12 by a frame 26 attached to the chamber 12. The frame 26 defines a vertical passage. A door actuator 28 can slide the door 20 upwards and downwards in the frame 26 relative to the chamber 12.

In particular, either the extrusion section 22 or the expulsion section 24 can be placed at the opening of the chamber 12. In the example shown, the expulsion section 24 is above the extrusion section 22 and the door actuator 28 moves the door 20 up and down. The frame 26 includes upper and lower sections shown in FIG. 2 extending above and below the opening of the chamber 12. These upper and lower sections have four sides and form rectangular channels essentially matching the size and shape of a horizontal cross section of the door 20. Vertical side plates 21 on either side of the opening of the chamber 12 (not visible in FIG. 2, see FIG. 4) connect the upper and lower sections of the 26. These vertical side plates 21 fit closely against the side of the door 20.

In the position shown in FIG. 2, the door 20 is at a raised position D. The extrusion section 22 covers an opening in the chamber 12 and the ram 14 is advancing towards position B to compress the organic waste 18. The extrusion section 22 optionally has a porous plate 30 and channel 34. The openings in the porous plate are typically cylindrical holes about 4 mm to 8 mm in diameter. In the example shown, a wet fraction 32 of the waste is squeezed through the porous plate 30 and falls downwards through a channel 34 in the door 20. In other options, some or all of wet fraction 32 can be squeezed through perforations in one or more walls of the chamber 12, and the porous plate 30 and channel 34 could be replaced with a solid (non-porous) structure. The wet fraction 32 may be collected, for example, in a wet fraction hopper 36 under the door 20. The ram 14 will stop when it reaches position B. The wet fraction 32 will stop flowing through the porous plate 30 soon after the ram reaches position B and a dry fraction 40 will be left in the chamber 12.

Figure 3:
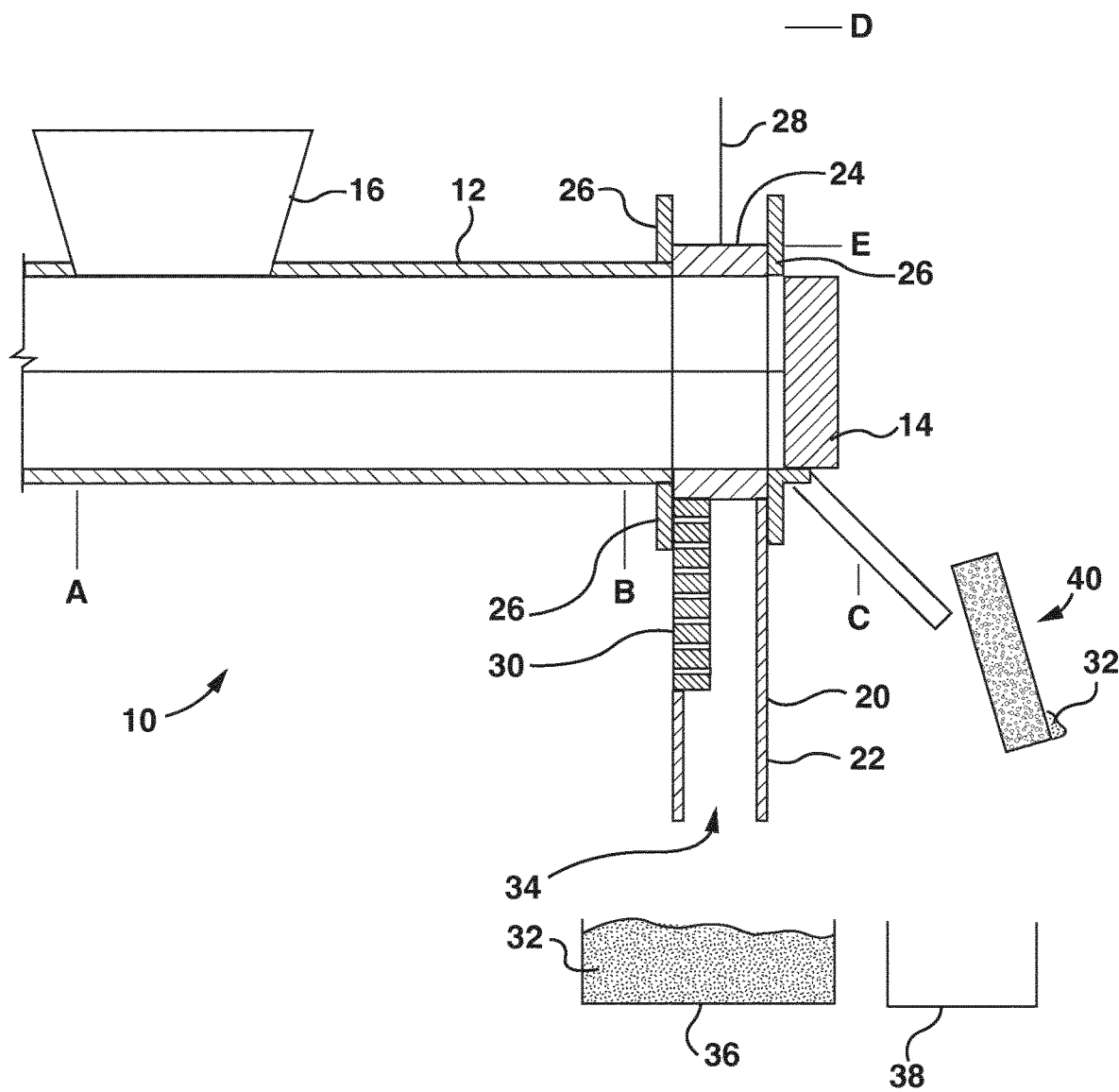
FIG. 3 shows a schematic cross-section in elevation view of the press of FIG. 1 while ejecting retained waste.

In the position shown in FIG. 3, the door 20 has been moved to lowered position E. The expulsion section 24 is now in line with the opening in the chamber 12. Ram 14 has advanced to position C and pushed the dry fraction 40 through the expulsion section 24 and out of the press 10. The dry fraction may be collected in a dry fraction hopper 38. In this example, the ram 14 that compresses the solid waste 18 moves in line with the expulsion section 24 and can be used to expel the dry fraction 40. Alternatively, the door 20 could be at a side of the chamber 12 and a second ram could be used to expel the dry fraction 40. The dry fraction 40 may form a cohesive block as shown or it might break apart into pieces as it is expelled from the press 10.

Referring to FIG. 2, compressing solid waste 18 can cause a small amount of wet fraction 32 to leak past frame 26 and collect in the expulsion section 24. Referring to FIG. 2, when the ram 14 expels dry fraction 40 through the expulsion section 24 it also scrapes the leaked wet fraction 32 out of the door 20. The leaked wet fraction 32 collects in dry fraction hopper 38, and is removed from the process in a controlled manner with the dry fraction 40. The amount of leaked wet fraction 32 is exaggerated in the figures and does not materially affect the efficiency of separation. The dry fraction 40 is not completely dry and already contains material like the leaked wet fraction 32 between larger particles in the dry fraction 40.

It is preferable for the expulsion section 24 to define an opening that is only slightly larger than the outside of the ram 14, at least at the bottom of the ram 14 but preferably all around the ram 14. Scraping the bottom of the expulsion section 24 removes much of the leaked wet fraction 32. However, because the wet fraction 32 is viscous and sticky, more nearly complete removal of the leaked wet fraction 32 is achieved by way of the door 20 scraping the leaked wet fraction 32 downwards out the of the upper section of the frame 26. Leaked wet fraction 32 collects on the upper part of the expulsion section 24, which is then scraped away by the ram 14. For this reason, it is preferable for the opening in the expulsion section 24 to essentially match the interior cross section of the chamber 12 and the exterior cross section of the ram 14.

Some wet fraction 32 also leaks out at the bottom of the door 20. However, this leakage falls downwards away from the press 10 and is less of a concern. In the case, as shown, where wet fraction 32 flows through a porous part of door 20, leaks below the door 20 merge with wet fraction intended to flow through the door 20 and are collected in wet fraction hopper 36.

Figure 4:
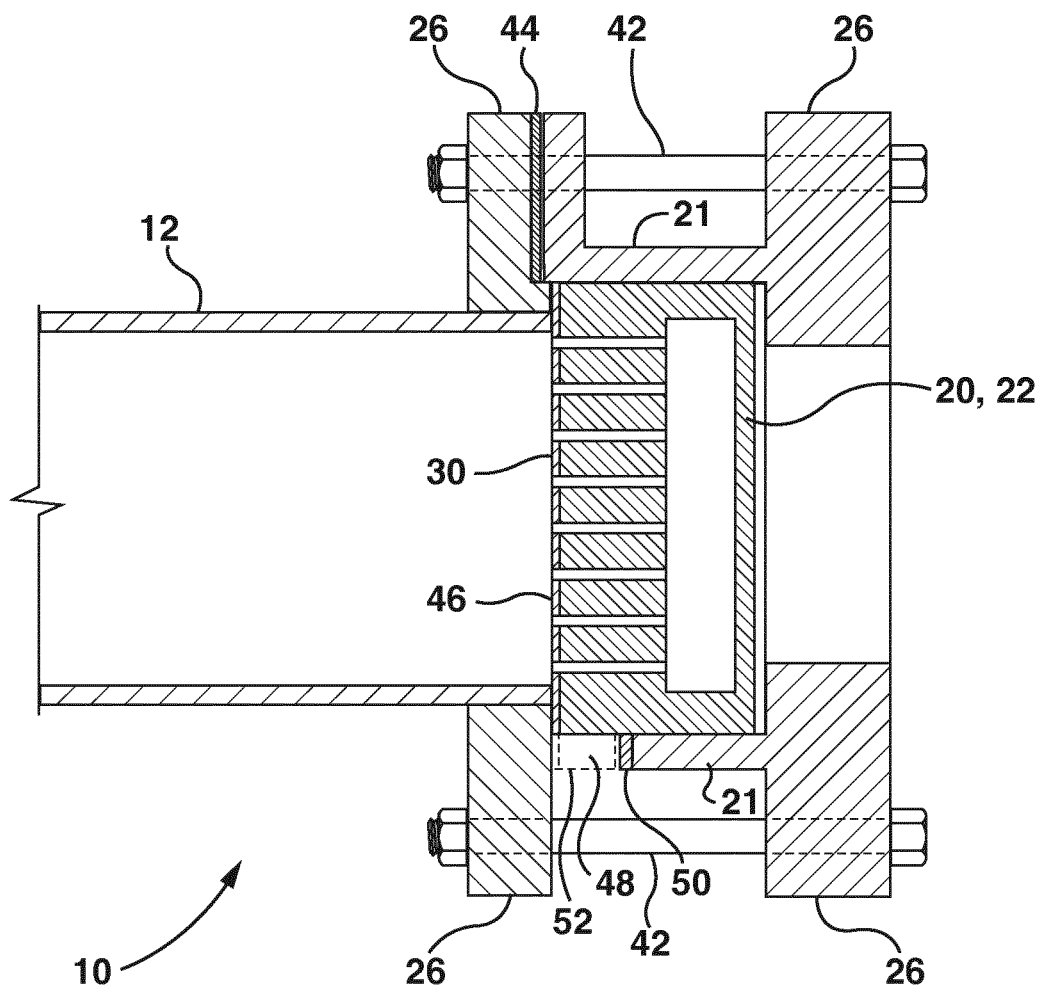
FIG. 4 shows a top view of the press of FIGS. 2 and 3.

FIG. 4 shows a top view of the press 10 emphasizing optional details of the frame 26. Two primary options are shown, one on the left side of the press 10 (bottom of the FIG. 4) and one on the right side of the press 10 (bottom of FIG. 4). However, the features of these options could also be combined.

The frame 26 may be made in two sections. One section is attached, optionally permanently, to chamber 12. The second section is attached to the first section by way of an adjustable fastening system, such as bolts 42. Tightening the nuts on bolts 42 draws the second section of the frame 26 closer to the chamber 12. Tightening the bolts compensates for wear that reduces the thickness of the door 20. Shims 44 can be placed between the two parts of the frame 26 when they are bolted together to provide more precise control over the spacing of the frame 26 parts. As the door 20 wears down, thinner shims are inserted to allow the second part of the frame to be pulled closer to the chamber 12.

The door 20 wears mostly on its front face, which is the face that slides against chamber 12 as the door 20 moves up and down. This is because lubricating grease can be injected between the back and at least parts of the sides of the door and the frame 26. In contrast, the front of the door slides over a film of abrasive wet fraction. The front face of the door 20 optionally has a removable wear plate 46. When the second part of the frame 26 has been moved as close as possible to the chamber 12 and leakage is still excessive, the old wear plate 46 is removed. A new wear plate 46 is fitted to the door 20 and the second part of the frame 26 is moved back away from the chamber 12.

On the left side of the press 10 shown in FIG. 4, the frame 26 fits closely against the sides of the door 20 and completely covers the side of the door 20. This generally prevents wet fraction 32 from leaking past the sides of the door 20, particularly if grease is placed between the sides and back of the door 20 and the frame 26. This is satisfactory for most presses.

In extremely high-pressure presses, a small amount of wet fraction may leak past the sides of the door 20. Rather then trying to prevent this leakage, the option shown on the right side of the press in FIG. 4 provides a pressure release channel 48 in the side of the frame 26. The position of the pressure release channel 48 shown is optional, and the channel 48 could instead be, for example, adjacent the back of the door 20 rather than the front of the door 20. A seal 50 separates the pressure release channel 48 from the greased parts of the frame 26. In particular, the seal 50 protects a part of the frame 26 that supports the back of the door 20 against the force of the ram 14 when waste is compressed. Optionally, a scraper 52 can be added to the door 20. The scraper 52 is shown in dashed lines in FIG. 4 because it is part of the expulsion section 24 rather than the extrusion section 22 shown in FIG. 4. When the door moves downwards, the scraper 52 removes leaked wet fraction from the pressure release channel 48.

In the press 10 described above the door is located in line with a ram that both compresses the solid waste and expels the non-organic fraction. In an alternative embodiment, a ram that compresses the solid waste may move perpendicular to the door and a second ram in line with the door may be used to expel the non-organic fraction.

We claim:

1. A press for separating waste into a dry fraction and a wet fraction, comprising:
    a chamber and a ram movable in the chamber, the chamber having an opening; and,
    a door fitted to the opening, the door movable in a frame and having an extrusion section and an expulsion section that alternatively cover the opening, the extrusion section including a porous plate and a channel extending vertically downwardly from behind the porous plate to below a lowest edge of the porous plate, such that the porous plate is between an upper portion of the channel and the ram, the expulsion section is located above the extrusion section,
    a wet fraction hopper is associated with said press below said door;
    wherein the extrusion section covers the opening when separating waste into the dry fraction and the wet fraction, and the expulsion section defines a passage for expelling the dry fraction from the chamber together with a leaked wet fraction spilled out of the chamber into the expulsion section of the door,
    wherein, when the extrusion section is aligned with the chamber, the ram presses the wet fraction through the porous plate and into the channel, and the wet fraction falls downwardly in the channel into said wet fraction hopper, and
    wherein, when the expulsion section is aligned with the chamber and the ram moves through the chamber, the ram expels the dry fraction and scrapes the leaked wet fraction out of the chamber.

2. The press of claim 1, wherein the passage defines a first cross section that is the same size and shape as a second cross section of the opening of the chamber.

3. The press of claim 1, wherein the porous plate comprises openings for the wet fraction of the waste to pass through the door.

4. The press of claim 1, wherein the door is slidable within the frame and at least part of the frame is movable relative to the chamber.

5. The press of claim 1, wherein the door is slidable within the frame and the side of the frame has a pressure release channel.

6. The press of claim 1, wherein the extrusion section is configured for having waste compressed against it.

7. The press of claim 1, wherein the wet fraction falls downwardly into the wet fraction hopper through a channel in a lower section of the frame.

8. The press of claim 3, wherein the openings extend from a front face of the porous plate to an opposing back face of the porous plate.

9. The press of claim 1, wherein the frame includes a first section directly attached to the chamber and a second section attached to the first section with an adjustable fastening mechanism.

10. The press of claim 9, wherein the frame includes a shim positioned between the first section and the second section to assist in controlling a spacing between the first section and the second section.

11. A method of pressing waste, comprising,
    pressing waste in a chamber by moving a ram in the chamber while an opening in the chamber is covered by a door having an extrusion section and an expulsion section located above the extrusion section, said pressing separating the waste into a wet fraction and a solid/dry fraction;
    while pressing the waste, driving the wet fraction through a porous plate in the extrusion section into a channel of the extrusion section, wherein the channel extends vertically downwardly from behind the porous plate to below a lowest edge of the porous plate, such that the plate is between an upper portion of the channel and the ram, so that the wet fraction falls downwardly in the channel;
    collecting the wet fraction in a wet fraction hopper positioned below the channel;
    lowering the door; and,
    expelling, with the ram, the solid/dry fraction from the chamber through an opening in the expulsion section of the door together with a leaked wet fraction generated through the pressing, wherein through action of the ram, the leaked wet fraction spills out of the chamber into the expulsion section of the door.

12. The method of claim 11, wherein the door slides in a frame forming a vertical passage.

13. The method of claim 11, comprising scraping the expulsion section of the door with the ram.

14. The method of claim 12, further comprising a step of moving at least part of the frame towards the chamber from time to time.

15. The method of claim 12, further comprising scraping a channel in a side of the frame with a scraper attached to the expulsion section of the door.

16. A press for separating waste into a dry fraction and a wet fraction, comprising:
    a chamber and a ram movable in the chamber, the chamber having an opening; and,
    a door fitted to the opening, the door movable in a frame and having an extrusion section and an expulsion section that alternatively cover the opening, the extrusion section including a porous plate and a channel, the expulsion section is located above the extrusion section,
    wherein the extrusion section covers the opening when separating waste into the dry fraction and the wet fraction, and the expulsion section defines a passage for expelling the dry fraction from the chamber together with a leaked wet fraction spilled out of the chamber into the expulsion section of the door,
    wherein, when the expulsion section is aligned with the chamber and the ram moves through the chamber, the ram expels the dry fraction and scrapes the leaked wet fraction out of the chamber,
    wherein the frame includes a first section directly attached to the chamber and a second section attached to the first section with an adjustable fastening mechanism, and the frame includes a shim positioned between the first section and the second section to assist in controlling a spacing between the first section and the second section.

17. A press for separating waste into a dry fraction and a wet fraction, comprising:
    a chamber and a ram movable in the chamber, the chamber having an opening; and, a door fitted to the opening, the door movable in a frame and having an extrusion section and an expulsion section that alternatively cover the opening, the extrusion section including a porous plate and a channel extending vertically downwardly from behind the porous plate to below a lowest edge of the porous plate, such that the porous plate is between an upper portion of the channel and the ram, the expulsion section is located above the extrusion section, said porous plate comprises openings for the wet fraction of the waste to pass through the door, said openings extend from the back face of the porous plate to an opposing front face of the porous plate, wherein the extrusion section covers the opening when separating waste into the dry fraction and the wet fraction, and the expulsion section defines a passage for expelling the dry fraction from the chamber together with a leaked wet fraction spilled out of the chamber into the expulsion section of the door; and wherein, when the expulsion section is aligned with the chamber and the ram moves through the chamber, the ram expels the dry fraction and scrapes the leaked wet fraction out of the chamber.

* * * * *